UNITED STATES PATENT OFFICE.

FERDINAND WIEDRING, OF CHICAGO, ILLINOIS.

PROCESS OF WASHING YEAST.

SPECIFICATION forming part of Letters Patent No. 539,562, dated May 21, 1895.

Application filed November 12, 1894. Serial No. 528,564. (No specimens.)

*To all whom it may concern:*

Be it known that I, FERDINAND WIEDRING, a citizen of the United States, residing at Chicago, in the county of Cook and State of Illinois, have invented a certain new and Improved Process of Washing Yeast, of which the following is a specification.

The present invention relates to the process of washing yeast for use in breweries and is not any way concerned with the manufacture of what is known as compressed yeast.

The quantity of yeast produced in brewing beer is always greatly in excess of what is needed for use in the brewery, and the greater portion of this product is thrown away. The object of the present invention is to provide a process by which the most desirable part of it can be quickly washed and separated from the rest and from foreign substances.

Yeast, which is one of the resulting products when beer is brewed from malt and hops, can be washed in water—that is to say, when such yeast is thoroughly mixed with a sufficient quantity of water, and the whole allowed to remain quiescent, it will then stratify, the pure yeast going to the bottom and the impurities settling in a well defined stratum between it and the superincumbent water; but yeast which is one of the resulting products when beer is brewed from cheaper materials, such as corn, rice, &c., cannot be washed in water. When such yeast is intimately mixed with water and the whole is allowed to remain quiescent, the yeast and its impurities settle together. I have discovered, however, that such yeast can be perfectly and quickly washed in beer, the process consisting simply in thoroughly mixing the yeast as it comes from the fermenting cask with a suitable quantity of beer, say sixty to seventy-five parts beer and twenty-five to thirty parts yeast and then allowing the whole to remain quiescent. In a few minutes the yeast will have settled to the bottom, leaving the dirt still held in suspension by the beer, and in a few minutes more the dirt will have settled in a well defined stratum between the yeast and beer.

If twenty-five parts yeast as it comes from the fermenting cask and seventy-five parts beer are mixed in a tumbler, in from seven to ten minutes the yeast will have settled to the bottom, leaving the dirt in suspension in the beer, and in from five to ten minutes more nearly all of the dirt will have settled in a well defined stratum on top of the yeast. If the same experiment be tried with water instead of beer, it will require a very much longer time for the dirt and yeast to settle, and when they do settle they will not be stratified so that they can be separated. When the yeast shall have settled it will still be mixed with a sufficient quantity of beer to make a fluid mass and this mass may be drawn off through a cock in the bottom of the receptacle or through a siphon.

In carrying out my process, the yeast may be drawn off as soon as it has settled and before the dirt has settled, or it may be drawn off after the dirt has settled. It should not, however, be allowed to stand long after the dirt has settled because it will give off gas, which, in rising, will mix the dirt and yeast together again.

I prefer to draw off the yeast as soon as it has settled and then allow the dirt to settle and then draw off the beer. The beer used in the process is not wasted and may be used again and again for the same purpose, or introduced at some other part of the process of brewing.

Whatever may be the properties of the yeast it is far preferable to wash it in beer instead of water, because when washed in water it is deteriorated.

I am aware that it has been proposed to mix pressed barm, or unpressed barm if not liquid enough, with cold pure water or pure wort and then allow the barm to settle, but neither water nor wort is the equivalent of beer for the purpose of washing yeast resulting from the brewing of beer from the cheap materials named. I am also aware that it has been proposed to separate yeast from fermented wort by causing the wort to flow along a chute, sufficiently slow to allow the yeast to settle to the bottom, but this is not the equivalent of my process of washing yeast.

What I claim as new, and desire to secure by Letters Patent, is—

1. The process of washing yeast, which consists in mixing it with a sufficient quantity of beer, allowing the whole to remain quiescent a sufficient length of time for the yeast to settle and then drawing off the yeast substantially as set forth.

2. The process of washing yeast which consists in mixing it with a sufficient quantity of beer, allowing the whole to remain quiescent a sufficient length of time to stratify and then drawing off the yeast substantially as set forth.

3. The process of washing yeast, which consists in mixing it with a sufficient quantity of beer, allowing the whole to remain quiescent a sufficient length of time to stratify and then drawing off the yeast and separating the beer from the precipitated impurities, substantially as set forth.

FERDINAND WIEDRING.

Witnesses:
R. HASENJAEGER,
L. M. HOPKINS.